United States Patent
Wiertellok et al.

(10) Patent No.: US 9,995,387 B2
(45) Date of Patent: Jun. 12, 2018

(54) HYDROSTATIC TRACTION DRIVE SYSTEM

(71) Applicant: Linde Hydraulics GmbH & Co. KG, Aschaffenburg (DE)

(72) Inventors: Markus Wiertellok, Sulzbach (DE); Wolfgang Kraft, Ringheim (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 378 days.

(21) Appl. No.: 14/928,336

(22) Filed: Oct. 30, 2015

(65) Prior Publication Data
US 2016/0144893 A1  May 26, 2016

(30) Foreign Application Priority Data

Nov. 26, 2014  (DE) .................. 10 2014 117 355

(51) Int. Cl.
| | |
|---|---|
| *F16H 61/4148* | (2010.01) |
| *F16H 61/47* | (2010.01) |
| *F16H 61/4008* | (2010.01) |
| *F16H 61/421* | (2010.01) |
| *F16H 61/46* | (2010.01) |
| *F16H 61/4035* | (2010.01) |
| *F16H 61/425* | (2010.01) |
| *F16H 61/456* | (2010.01) |

(Continued)

(52) U.S. Cl.
CPC .......... *F16H 61/47* (2013.01); *B62D 11/003* (2013.01); *B62D 11/005* (2013.01); *B62D 11/06* (2013.01); *F16H 61/4008* (2013.01); *F16H 61/4035* (2013.01); *F16H 61/4148* (2013.01); *F16H 61/421* (2013.01); *F16H 61/425* (2013.01); *F16H 61/456* (2013.01); *F16H 61/46* (2013.01)

(58) Field of Classification Search
CPC .. F16H 61/421; F16H 61/4035; F16H 61/456; F16H 61/452; F16H 61/4148; F16H 61/425; F16H 61/47; F16H 61/46; F16H 61/4008; B62D 11/06; B62D 11/003; B62D 11/005
USPC .................................... 60/445, 451
See application file for complete search history.

(56) References Cited

U.S. PATENT DOCUMENTS

| | | |
|---|---|---|
| 4,011,920 A | 3/1977 | Bianchetta et al. |
| 4,399,886 A * | 8/1983 | Pollman ................ F16H 61/423 180/197 |

(Continued)

FOREIGN PATENT DOCUMENTS

DE          4303243 C2    11/1994

*Primary Examiner* — Thomas E Lazo
*Assistant Examiner* — Dustin T Nguyen
(74) *Attorney, Agent, or Firm* — The Webb Law Firm

(57) ABSTRACT

A hydrostatic traction drive system of a mobile machine has a first hydraulic traction motor associated with a first vehicle side and a second hydraulic traction motor associated with a second vehicle side. The hydraulic traction motors are operated in an open circuit and are jointly supplied with hydraulic fluid by a single hydraulic pump. The first hydraulic traction motor is controlled by a first control valve and the second hydraulic traction motor is controlled by a second control valve. The first hydraulic traction motor and the second hydraulic traction motor are each variable displacement motors with an electrically variable displacement volume, and the first control valve and the second control valve are electrically actuatable control valves.

12 Claims, 1 Drawing Sheet

(51) Int. Cl.
*B62D 11/00* (2006.01)
*B62D 11/06* (2006.01)

(56) References Cited

U.S. PATENT DOCUMENTS

| | | | |
|---|---|---|---|
| 4,769,991 A * | 9/1988 | Johnson | E02F 9/2253 180/6.48 |
| 4,914,592 A | 4/1990 | Callahan et al. | |
| 5,197,283 A * | 3/1993 | Kagiwada | E02F 9/123 60/451 |
| 5,660,041 A | 8/1997 | Hartung et al. | |
| 5,857,330 A | 1/1999 | Ishizaki et al. | |
| 5,875,631 A | 3/1999 | Smith | |
| 7,926,267 B2 * | 4/2011 | Koehler | F16D 31/02 60/445 |
| 2009/0057049 A1 | 3/2009 | Yamada et al. | |
| 2012/0310492 A1 * | 12/2012 | Karasawa | E02F 9/2253 701/50 |
| 2013/0133319 A1 * | 5/2013 | Lacher | E02F 9/2253 60/327 |

\* cited by examiner

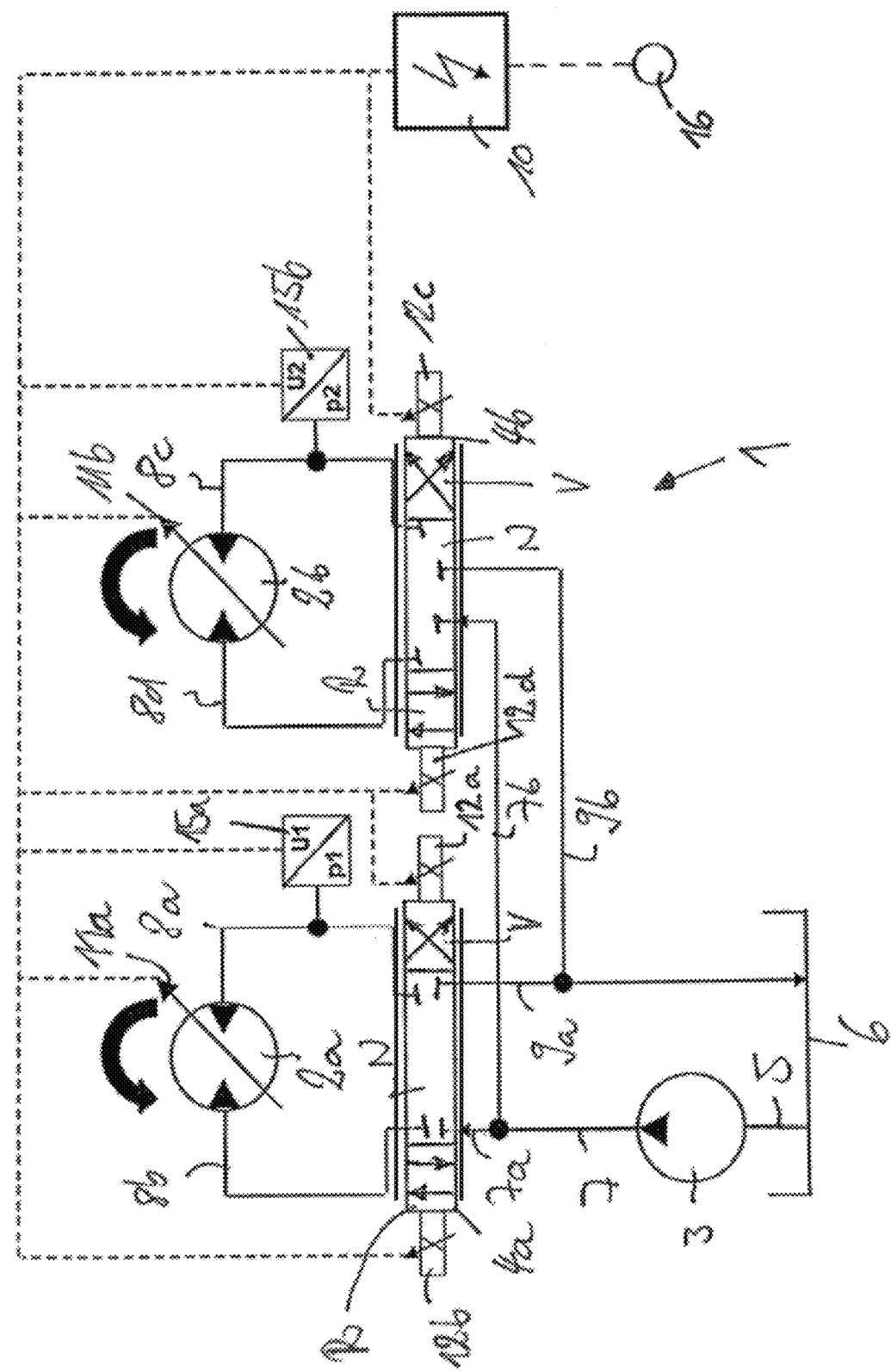

HYDROSTATIC TRACTION DRIVE SYSTEM

CROSS REFERENCE TO RELATED APPLICATION

This application claims priority to German Application No. DE 10 2014 117 355.4, filed Nov. 26, 2014, which is herein incorporated by reference in its entirety.

BACKGROUND OF THE INVENTION

Field of the Invention

This invention relates to a hydrostatic traction drive system of a mobile machine with a first hydraulic traction motor associated with a first vehicle side and a second hydraulic traction motor associated with a second vehicle side. The two traction motors are each operated in an open circuit and are jointly supplied with hydraulic fluid by a single hydraulic pump. The first traction motor can be controlled by a first control valve and the section traction motor can be controlled by a second control valve.

Description of Related Art

Hydrostatic traction drive systems on mobile machines in which a hydraulic traction motor is associated with each vehicle side are referred to as bilateral traction drive systems. Bilateral traction drive systems make it possible to steer the mobile machine by differential steering. Traction drive systems of this type are used, for example, on mobile machines in the form of tracked vehicles, such as excavators, tracked bulldozers, or tracked loaders, wherein the traction motors drive corresponding caterpillar treads or tracks.

DE 43 03 243 C2 describes a bilateral hydrostatic traction drive system for a mobile machine in which the two hydraulic traction motors are each operated in a closed circuit and a first hydraulic pump is provided for the supply of the first hydraulic traction motor and a second hydraulic pump is provided for the supply of the second hydraulic traction motor. Bilateral hydrostatic traction drive systems in which a separate hydraulic pump is associated with each hydraulic traction motor are termed dual circuit systems. Dual circuit systems offer energy-efficient performance when the mobile machine travels around a curve, although on account of the two hydraulic traction pumps the effort and expense of construction are high.

The effort and expense involved in the construction of bilateral hydrostatic traction drive systems can be reduced by the use of a single-circuit system, in which the two hydraulic traction motors are each operated in an open circuit and a single hydraulic pump is used to supply the two hydraulic traction motors. When the mobile machine comprising a bilateral hydrostatic traction drive system having a single-circuit travels around a curve, however, high differential pressures can occur between the two traction motors and as a result high power losses can occur.

SUMMARY OF THE INVENTION

An object of this invention is to provide a hydrostatic traction drive system that offers energy-efficient operation when the mobile machine travels around a curve.

The invention teaches that this object can be accomplished in that the first traction motor and the second traction motor are each variable displacement motors with an electrically variable displacement volume. The first control valve and the second control valve are each an electrically actuated control valve, wherein an electronic control device controls the displacement volumes of both traction motors and actuates the control valves. The electronic control device is designed so that during travel around a curve, by varying the displacement volume of one of the two traction motors and by actuating the associated control valve, the inlet-side pressures of the two traction motors are brought to an equal pressure level and are preferably closed-loop controlled. In the traction drive system according to the invention, during travel around a curve, the electronic control device therefore makes it possible, in a single-circuit system in which the two traction motors are supplied with hydraulic fluid by a single pump, by a suitable variation of the displacement volume of one of the two traction motors and corresponding actuation of the control valve associated with the traction motor whose displacement volume is to be varied, to adjust the volumetric flow to the traction motor to bring the inlet-side pressures of the two traction motors to an equal pressure level. The inlet-side pressures and, therefore, the driving pressures on the two traction motors, are thereby equalized with each other by the electronic control device when the mobile machine travels around a curve. As a result of the equalization of the two inlet-side and driving pressures on the two traction motors, and thus the equalization of the two inlet-side pressures on the two traction motors, the differential pressures on the two control valves are also equal because the same delivery pressure of the pump is present at both traction motors on the inlet side. Consequently, the energy-inefficient high pressure differences on the two traction motors that occur during travel around a curve in a single-circuit system are avoided, so that the traction drive according to the invention offers energy-efficient operation with low power losses during travel around a curve.

In one advantageous embodiment of the invention, for the equalization of the inlet-side pressures on the two traction motors during travel around a curve, the electronic control device reduces for the travel around a curve the actuation of the control valve associated with the vehicle side on the inside of the curve, and during travel around a curve the electronic control device regulates the inlet-side pressure of the traction motor on the inside of the curve to the inlet-side pressure of the traction motor on the outside of the curve in a closed-loop control. As a result of the reduction of the actuation of the control valve associated with the vehicle side on the inside of the curve, i.e. a reduction of the flow cross-section on this control valve, the electronic control device can in a simple manner specify a differential speed of rotation of the two traction motors for the corresponding travel of the mobile machine around a curve, and can initiate travel around a curve. As a result, the traction motor on the outside of the curve becomes the driving traction motor and the inlet-side pressure on the traction motor on the outside of the curve increases. As a result of the closed-loop control of the inlet-side pressure of the traction motor on the inside of the curve to the inlet-side pressure of the traction motor on the outer side of the curve, equal inlet-side pressures on the two traction motors can thereby be achieved in a simple manner during travel around a curve.

For the equalization of the inlet-side pressures on the two traction motors, the inlet-side pressure on the traction motor on the inside of the curve is increased by the electronic control device to the inlet-side pressure of the traction motor on the outside of the curve. For the closed-loop control of the inlet-side pressure to the traction motor on the inside of the curve to the inlet-side pressure of the traction motor on the outside of the curve, the electronic control device reduces the displacement volume of the traction motor on the inside of the curve and the actuation of the control valve associated with the traction motor on the inside of the curve is reduced to prevent an increase in the speed of the traction motor on the inside of the curve. As a result of the reduction of the displacement volume of the traction motor on the inside of the curve, the inlet-side pressure of the traction motor on the inside of the curve increases, so that the inlet-side pressure of the traction motor on the inside of the curve is equalized to the inlet-side pressure of the traction motor on the outside of the curve. The inlet-side pressure of the traction motor on the inside of the curve therefore represents the controlled variable that should be equal to the inlet-side pressure of the traction motor on the outside of the curve. As a result of the reduction of the displacement volume of the traction motor on the inside of the curve, with an unchanged actuation of the control valve of the traction motor on the inside of the curve and thus an un-changed volumetric flow to the traction motor on the inside of the curve, the speed of which would be increased, the actuation of the control valve associated with the vehicle side on the inside of the curve is reduced by the electronic control device. Thus, the control valve of the traction motor on the inside of the curve is reset toward a reduction of the flow cross-section, so that an increase in the speed of the traction motor on the inside of the curve is prevented. The flow cross-section on the control valve of the traction motor on the inside of the curve is thereby reduced by the proportion that the speed of the traction motor on the inside of the curve would increase as a result of the reduction of the displacement volume.

The corresponding actuation of the control valve toward a reduction of the flow cross-section to the value corresponding to the reduction of the displacement volume can be determined by the electronic control device. The electronic control device calculates the hydraulic flow demand of the traction motor on the inside of the curve from the displacement volume set of the traction motor on the inside of the curve, e.g. a setpoint pivot angle generated by a control device of a traction motor in the form of a bent-axis motor or a swashplate motor, and the control valve of the traction motor on the inside of the curve is set to the calculated hydraulic flow demand of the traction motor on the inside of the curve.

The control valve of the traction motor on the inside of the curve can be set in a simple manner by the electronic control device to the calculated hydraulic flow demand of the traction motor on the inside of the curve. The hydraulic flow delivered to the control valve of the traction motor on the inside of the curve is calculated by the electronic control device from the actuation signal of the control valve and the pressure differential at the control valve.

In an alternative and advantageous embodiment of the invention, for the equalization of the inlet-side pressures on the two traction motors during travel around a curve, the electronic control device reduces for the travel around a curve the actuation of the control valve corresponding to the vehicle side on the inside of the curve and, during travel around a curve, the inlet-side pressure of the traction motor on the outside of the curve is set by a closed-loop control by the electronic control device to the inlet-side pressure of the traction motor on the inside of the curve. As a result of the reduction of the actuation of the control valve associated with the vehicle side on the inside of the curve, i.e. a reduction of the flow cross-section on this control valve, the electronic control device can specify in a simple manner a speed differential to the two traction motors for the corresponding travel of the mobile machine around a curve. As a result, the traction motor on the outside of the curve thereby becomes the driving traction motor and the inlet-side pressure on the traction motor on the outside of the curve increases. Simultaneously, the traction motor on the inside of the curve becomes the trailing traction motor and the inlet-side pressure to the traction motor on the inside of the curve decreases. As a result of the closed-loop control of the inlet-side pressure of the traction motor on the outside of the curve to the inlet-side pressure of the traction motor on the inside of the curve, equal inlet-side pressures can be achieved on the two traction motors in a simple manner during travel around a curve.

For the equalization of the inlet-side pressures on the two traction motors, the inlet-side pressure on the traction motor on the outside of the curve is reduced by the electronic control device to the inlet-side pressure of the traction motor on the inside of the curve. For the closed-loop control of the inlet-side pressure of the traction motor on the outside of the curve to the inlet-side pressure of the traction motor on the inside of the curve, the displacement volume of the traction motor on the outside of the curve is increased by the electronic control device and the actuation of the control valve associated with the traction motor on the outside of the curve is increased to prevent a decrease in the speed of the traction motor on the outside of the curve. As a result of the increase of the displacement volume of the traction motor on the outside of the curve, the inlet-side pressure on the traction motor on the outside of the curve decreases, so that the inlet-side pressure of the traction motor on the outside of the curve can be equalized to the inlet-side pressure of the traction motor on the inside of the curve. The inlet-side pressure of the traction motor on the outside of the curve therefore represents the controlled variable that should be equal to the inlet-side pressure of the traction motor on the inside of the curve. Because of the increase of the displacement volume of the traction motor on the outside of the curve, with an unchanged actuation of the control valve of the traction motor on the outside of the curve and therefore the unchanged volumetric flow to the traction motor on the outside of the curve, the speed of which would be reduced, the electronic control device increases the actuation of the control valve associated with the vehicle side on the outside of the curve and therefore resets the control valve of the traction motor on the outside of the curve toward an enlargement of the flow cross-section. The hydraulic flow demand increased by the enlargement of the displacement volume of the traction motor on the outside of the curve is met, and a speed decrease of the traction motor on the outside of the curve is prevented. The flow cross-section on the control valve of the traction motor on the outside of the curve is enlarged in a ratio by which the speed of the traction motor on the outside of the curve would be reduced by the enlargement of the displacement volume.

The corresponding actuation of the control valve toward an enlargement of the flow cross-section to the value resulting from the enlargement of the displacement volume can be determined by the electronic control device. The electronic control device calculates the hydraulic flow demand of the traction motor on the outside of the curve from the displacement volume of the traction motor on the outside of the curve, e.g. a setpoint pivot angle generated by a control device of a traction motor in the form of a bent-axis motor or swashplate motor, and sets the control valve of the traction motor on the outside of the curve to the calculated hydraulic flow demand of the traction motor on the outside of the curve.

The control valve of the traction motor on the outside of the curve can be set in a simple manner by the electronic control device to the calculated volumetric flow demand of the traction motor on the outside of the curve. The electronic control device calculates the hydraulic flow delivered to the control valve of the traction motor on the outside of the curve from the actuation signal of the control valve and the pressure differential on the control valve.

In one advantageous development of the invention, the electronic control device is in an operative connection with pressure sensors, by means of which the inlet-side pressure at the first traction motor and at the second traction motor can be measured. As a result, during travel around a curve it becomes possible in a simple manner for the electronic control device to measure the inlet-side pressures of the two traction motors and equalize them to each other.

In one advantageous embodiment of the invention, the first traction motor drives a first caterpillar track, e.g. a crawler track or chain tread of the first vehicle side of the mobile machine and the second traction motor drives a second caterpillar track, e.g. a crawler track or chain tread of the second vehicle side of the mobile machine.

The invention further relates to a method for the operation of a hydrostatic traction drive system of a mobile machine, wherein the traction drive system has a first hydraulic traction motor that is associated with a first vehicle side and a second hydraulic traction motor that is associated with a second vehicle side. The two traction motors are each operated in an open circuit and are jointly supplied with hydraulic fluid by a single hydraulic pump. The first traction motor is controlled by a first control valve and the section traction motor is controlled by a second control valve, wherein a speed differential between the two traction motors is set to enable the mobile machine to travel around a curve.

An object of the invention, namely to make possible the energy-efficient operation of a hydrostatic traction drive system of this type on a mobile machine traveling around a curve, is accomplished in that during travel around a curve, the displacement volume of the traction motor on the inside of the curve is reduced, and simultaneously, by an actuation of the control valve associated with the traction motor on the inside of the curve, the volume of hydraulic fluid delivered to the traction motor on the inside of the curve is reduced so that the inlet-side pressure of the traction motor on the inside of the curve is equalized to the inlet-side pressure of the traction motor on the outside of the curve, thereby preventing an increase in the speed of the traction motor on the inside of the curve.

The object of the invention described above is alternatively accomplished by a method according to the invention in which, during travel around a curve, the displacement volume of the traction motor on the outside of the curve is increased and simultaneously, by actuation of the control valve associated with the traction motor on the outside of the curve, the volume of hydraulic fluid delivered to the traction motor on the outside of the curve is increased so that the inlet-side pressure of the traction motor on the outside of the curve is equalized to the inlet-side pressure of the traction drive on the inside of the curve, thereby preventing a decrease in the speed of the traction motor on the outside of the curve.

During travel around a curve and a corresponding speed differential between the two traction motors, the inlet-side and driving pressures on the two traction motors are equalized to each other and therefore the inlet-side and driving pressures on the two traction motors are kept equal during travel around a curve. Because the inlet-side pressures of the two traction motors are equalized to each other during travel around a curve, the pressure differences at the two control valves are also equal since the same delivery pressure of the pump is present at the two traction motors on the inlet side. Therefore, during travel around a curve, the energy-inefficient high differential pressures on the two traction motors in a single-circuit system can be avoided, so that the traction drive system according to the invention offers energy-efficient operation with low power losses during travel around a curve.

BRIEF DESCRIPTION OF THE DRAWING

Additional advantages and details of the invention are explained in greater detail below with reference to the exemplary embodiment illustrated in the accompanying schematic FIGURE.

The FIGURE shows a circuit diagram of a hydrostatic traction drive system as described herein on a mobile machine with a differential speed steering system.

DESCRIPTION OF THE INVENTION

The traction drive system 1 of a mobile machine has a first hydraulic traction motor 2a for the drive of a first side of the vehicle, e.g. the left side of the vehicle, and a second hydraulic traction motor 2b for the drive of a second side of the vehicle, e.g. the right side of the vehicle. The traction motors 2a, 2b can each drive a caterpillar track, for example a caterpillar tread or a chain tread.

The first traction motor 2a and the second traction motor 2b are each operated in an open circuit. A single hydraulic pump 3 is provided to supply the two traction motors 2a, 2b with hydraulic fluid, so that the traction drive system 1 forms a single-circuit system in which a single pump 3 supplies both traction motors 2a, 2b with hydraulic fluid. For the drive system, the pump 3 is in a drive connection, in a manner not illustrated in detail, with a drive motor, such as an internal combustion engine, of the mobile machine.

Associated with the first traction motor 2a is a first control valve 4a with which the direction of rotation and speed of the first traction motor 2a can be controlled. Likewise, associated with the second traction motor 2b is a second control valve 4b with which the direction of rotation and speed of the second traction motor 2b can be controlled. The control valves 4a, 4b are each in the form of directional control valves that function as throttles in intermediate positions.

The pump 3 is operated in an open circuit and sucks hydraulic fluid out of a reservoir 6 by means of an intake line 5. The pump 3 delivers into a delivery line 7, from which a first input line 7a leads to the first control valve 4a and a second input line 7b leads to the second control valve 4b.

The first control valve 4a is in communication by means of connecting lines 8a, 8b with the first traction motor 2a. The first control valve 4a is further in communication with a return line 9a that leads to the reservoir 6. The second control valve 4b is in communication by means of connecting lines 8c, 8d with the second traction motor 2b. The second control valve 4b is also in communication with a return line 9b that leads to the reservoir 6.

The traction motors 2a, 2b are each continuously variable displacement motors with variable displacement volumes. The displacement volumes of the first traction motor 2a and the second traction motor 2b can each be adjusted electrically, whereby an electronic control device 10 generates corresponding electrical actuation signals for actuator devices 11a, 11b of the traction motors 2a, 2b.

The control valves 4a, 4b each have a neutral position N, a position for forward travel V, and a position for reverse travel R. In the neutral position N, the communication of the input line 7a or 7a and the return line 9a or 9b, respectively, with the connecting lines 8a, 8b or 8c, 8d, respectively, is shut off. In the position of the control valve 4a for forward travel V, the input line 7a is in communication with the connecting line 8a and the connecting line 8b is in communication with the return line 9a. In the position of the control valve 4a for reverse travel R, the input line 7a is in communication with the connecting line 8b and the connecting line 8a is in communication with the return line 9a. In the position of the control valve 4b for forward travel V, the input line 7b is in communication with a connecting line 8c and the connecting line 8d is in communication with the return line 9b. In the position of the control valve 4b for reverse travel R, the input line 7b is in communication with the connecting line 8d and the connecting line 8c is in communication with the return line 9b.

The control valves 4a, 4b can be actuated electrically and for actuation are in communication with the electronic control device 10. The control valves 4a, 4b can be actuated into the neutral position N by spring devices, such as springs, that are not illustrated in detail and can be actuated with corresponding electrical actuator devices 12a, 12b, 12c, 12d into the position for forward travel V and the position for reverse travel R.

On the input side, the electronic control device 10 is in communication with pressure sensors 15a, 15b, by means of which the inlet-side pressure on the traction motors 2a, 2b can be measured during traction operation. In the exemplary embodiment illustrated in the FIGURE, the pressure sensor 15a is in communication with the connecting line 8a to measure the inlet-side pressure p1 of the first traction motor 2a, and the pressure sensor 15b is in communication with the connecting line 8c to measure the inlet-side pressure p2 of the second traction motor 2b, whereby the connecting lines 8a, 8c, when the control valves 4a, 4b are in the position for forward travel V, form the inlet-side connecting lines, so that when the mobile machine is traveling forward, the inlet-side pressures p1, p2 on the two traction motors 2a, 2b can be measured with the respective pressure sensors 15a, 15b. Corresponding pressure sensors, by means of which the respective inlet-side pressure on the two traction motors 2a, 2b can be measured during reverse travel, can be in communication with the connecting lines 8c, 8d.

On the input side, the electronic control device 10 is in turn operatively connected with a transducer 16, by means of which a travel of the mobile machine on a curve can be specified.

In the traction drive system 1 according to the invention, during travel around a curve, the displacement volume of one of the two traction motors 2a or 2b is varied and the control valve 4a or 4b associated with the traction motor 2a or 2b, which displacement volume is varied, is varied by the electronic control device 10 in such way, so that the inlet-side pressures of the two traction motors are brought to an equal pressure level and, therefore, the two inlet-side pressures of the two traction motors 2a, 2b are equalized with each other during travel around a curve. Consequently, the inlet-side pressures at the traction motors 2a, 2b that drive the corresponding traction motor 2a, 2b are equal, so that the pressure differential at the control valves 4a, 4b are also equal and the same delivery pressure from the pump 3 is present at the two traction motors 2a, 2b resulting in an energy-efficient operation of the traction drive system 1 during travel around a curve with low power losses.

The traction drive system 1 and its operation during travel of the mobile machine during forward travel around a curve to the left are described below, wherein the traction motor 2a and the control valve 4a are associated with the left side of the vehicle and therefore, the vehicle side on the inside of the curve, and the traction motor 2b and the control valve 4b are associated with the right side of the vehicle and therefore the vehicle side on the outside of the curve. It goes without saying that during travel around a curve to the right, the below disclosure is implemented analogously.

Starting from traction operation (forward travel, in which the connecting lines 8a, 8c in the position of the control valves 4a, 4b for forward travel V are in communication with the pump 3 and form the inlet sides of the traction motors 2a, 2b) with the mobile machine traveling straight ahead at a specified speed of travel, the two traction motors 2a, 2b are set to a displacement volume appropriate to achieve the speed of travel and the control valves 4a, 4b are actuated to a determined flow cross section into the forward travel position V. To initiate travel of the mobile machine around a curve to the left, a differential speed is specified by the electronic control device 10 and set on the two traction motors 2a, 2b by reducing the actuation of the control valve 4a associated with the traction motor 2a on the inside of the curve and, thus, the flow cross section of the control valve 4a associated with the traction motor 2a on the inside of the curve is reduced, so that a reduced volume of hydraulic fluid flows to the traction motor 2a on the inside of the curve. As a result, during travel around a curve, the traction motor 2b on the outside of the curve becomes the driving traction motor, its inlet-side pressure p2 increases, and the traction motor 2a on the inside of the curve becomes the trailing traction motor and its inlet-side pressure p1 falls.

To then equalize the inlet-side pressures p1, p2 of the two traction motors 2a, 2b to each other during travel around a curve, in a first embodiment of the invention, the electronic control device 10 reduces the displacement volume of the traction motor 2a on the inside of the curve, for example on an axial piston machine utilizing a swashplate construction, by reducing the pivot angle of the variable-inclination swashplate. In the first embodiment of the invention, the inlet-side pressure p1 of the traction motor 2a on the inside of the curve forms the controlled variable that is regulated in a feedback loop to the inlet-side pressure p2 of the traction motor 2b on the outside of the curve, to achieve equal inlet-side pressures p1, p2 on the two traction motors 2a, 2b during travel around a curve. The reduction of the displacement volume of the traction motor 2a on the inside of the curve results in an increase of its inlet-side pressure p1. If the inlet-side volumetric flow of hydraulic fluid that can flow via the control valve 4a into the connecting line 8a were to stay the same, the reduction of the displacement volume of the traction motor 2a on the inside of the curve would cause an increase in the speed of the traction motor 2a on the inside of the curve. To prevent this increase in the speed of the traction motor 2a on the inside of the curve, the electronic control device 10, simultaneously with the reduction of the displacement volume of the traction motor 2a on the inside of the curve, reduces the actuation of the control valve 4a associated with the traction motor 2a on the inside of the curve and thus, actuates the control valve 4a toward the neutral position N to reduce the flow cross section. The flow cross-section at the control valve 4a is thereby reduced by a corresponding actuation of the control valve 4a by the proportion by which the speed of the traction motor 2a on the inside of the curve would increase as a result of the reduction of the displacement volume. As a result, while maintaining the speed differential on the two traction motors 2a, 2b during travel around a curve, the inlet-side pressure p1 of the traction motor 2a on the inside of the curve that forms the controlled pressure is regulated by a closed-loop control to the inlet-side pressure p2 of the traction motor 2b on the outside of the curve.

The electronic control device 10 can calculate the inlet-side hydraulic fluid volumetric flow demand of the traction motor 2a on the inside of the curve from the currently set displacement volume of the traction motor 2a on the inside of the curve (setpoint pivot angle which is specified by the electronic control device 10 to the traction motor 2a to increase the pressure p1). The volumetric flow of hydraulic fluid delivered to the control valve 4a of the inlet side of the traction motor 2a can be calculated by the electronic control device 10 from the value of the actuation signal of the actuator device 12a and the constant pressure differential across the control valve 4a, which is stored in the electronic control device 10. The electronic control device 10 can thereby determine a corresponding actuation signal for the control valve 4a and actuate the control valve 4a simultaneously with the reduction of the displacement volume of the traction motor 2a, so that at the control valve 4a, simultaneously with the reduction of the displacement volume of the traction motor 2a, the flow cross section and, thus, the inlet-side volumetric flow of hydraulic fluid, are reduced so that an increase in the speed of the traction motor 2a on the inside of the curve is prevented.

In a second embodiment of the invention, during travel around a curve, for the equalization of the inlet-side pressures p1, p2 of the two traction motors 2a, 2b by the electronic control device 10, the displacement volume of the traction motor 2b on the outside of the curve is increased, for example, on an axial piston machine utilizing a swashplate construction, by increasing the pivot angle of the variable-inclination swashplate. In the second embodiment of the invention, the inlet-side pressure p2 of the traction motor 2b on the outside of the curve forms the controlled variable that is regulated to the inlet-side pressure p1 of the traction motor 2a on the inside of the curve, to achieve identical inlet-side pressures p1, p2 on the two traction motors 2a, 2b during travel around a curve. As a result of the increase of the displacement volume of the traction motor 2b on the outside of the curve, its inlet-side pressure p2 decreases. If the inlet-side volumetric flow of hydraulic fluid that can flow via the control valve 4b into the connecting line 8c were to remain unchanged, the increase of the displacement volume of the traction motor 2b on the outside of the curve would cause the speed of the traction motor 2b on the outside of the curve to decrease. To prevent this decrease in the speed of the traction motor 2b on the outside of the curve, the electronic control device 10, simultaneously with the increase of the displacement volume of the traction motor 2b on the outside of the curve, increases the actuation of the control valve 4b associated with the traction motor 2b on the outside of the curve and thus, actuates the control valve 4b to enlarge the flow cross section more toward the position V for the forward direction of travel to be able to meet the increased volumetric flow demand of the traction motor 2b on the outside of the curve. The flow cross section on the control valve 4b is thereby enlarged by a corresponding actuation of the control valve 4b by the proportion by which the speed of the traction motor 2b on the outside of the curve would decrease as a result of the increase of the displacement volume. Consequently, while maintaining the speed differential on the two traction motors 2a, 2b during travel around a curve, the inlet-side pressure p2 of the traction motor 2b on the outside of the curve that forms the controlled variable is regulated in a feedback loop to the inlet-side pressure p1 of the traction motor 2a on the inside of the curve.

The electronic control device 10 calculates the inlet-side hydraulic fluid volumetric flow requirement of the traction motor 2b on the outside of the curve from the currently set displacement volume of the traction motor 2b on the outside of the curve (setpoint pivot angle, which is specified by the electronic control device to the traction motor 2b for the reduction of the pressure p2). The volumetric flow of hydraulic fluid delivered to the control valve 4b of the inlet side of the traction motor 2b is calculated by the electronic control device 10 from the value of the actuation signal of the actuator device 12c and the constant differential pressure across the control valve 4b which is stored in the electronic control device 10. The electronic control device 10 can thus define a corresponding actuation signal for the control valve 4b and actuate the control valve 4b simultaneously with the increase of the displacement volume of the traction motor 2b so that on the control valve 4b, simultaneously with the increase of the displacement volume of the traction motor 2b, the flow cross section, and thus the inlet-side hydraulic fluid volumetric flow, are increased such that a decrease in the speed of the traction motor 2b on the outside of the curve is prevented.

The traction drive system 1, in which both traction motors 2a, 2b are supplied with hydraulic fluid by a single pump 3 in the open circuit, can therefore be operated optimally from an energy-efficiency point of view in a single-circuit system when the mobile machine travels around a curve. Because only a single pump 3 is necessary to supply both traction motors 2a, 2b, the traction drive system 1 according to the invention requires less construction effort and expense than a dual-circuit system in which each traction motor is supplied by its own pump. In addition, the traction drive system according to the invention does not require a block valve with which the two traction motors 2a, 2b can be coupled to each other when the mobile machine is traveling straight ahead and uncoupled when it travels around a curve. This further contributes to additional cost saving and eliminates the disadvantages related to a block valve, which include the fact that the block valve causes a jerk in the traction movement of the mobile machine during coupling and uncoupling processes.

It will be readily appreciated by those skilled in the art that modifications may be made to the invention without departing from the concepts disclosed in the foregoing description. Accordingly, the particular embodiments described in detail here are illustrative only and are not limiting to the scope of the invention, which is to be given the full breadth of the appended claims and any and all equivalents thereof.

The invention claimed is:

1. A hydrostatic traction drive system of a mobile machine, comprising:
   a first hydraulic traction motor associated with a first vehicle side and a second hydraulic traction motor associated with a second vehicle side, wherein the first and second hydraulic traction motors are operated in an open circuit and are jointly supplied with hydraulic fluid by a single hydraulic pump, wherein the first hydraulic traction motor is controlled by a first control valve and the second hydraulic traction motor is controlled by a second control valve, wherein the first hydraulic traction motor and the second hydraulic traction motor are each variable displacement motors with an electrically variable displacement volume, and the first control valve and the second control valve are each electrically actuatable control valves, wherein an electronic control device controls the displacement volumes of the first and second hydraulic traction motors and actuates the control valves, wherein the electronic control device is constructed such that during travel around a curve, inlet-side pressures of the first and second hydraulic traction motors are brought to the same pressure level by varying the displacement volume of one of the two traction motors and by actuation of the associated control valve.

2. The hydrostatic traction drive system as recited in claim 1, wherein for travel around a curve, the actuation of the control valve associated with the vehicle side on the inside of the curve is reduced by the electronic control device, and during travel around a curve the inlet-side pressure of the hydraulic traction motor on the inside of the curve is controlled by the electronic control device to the inlet-side pressure of the hydraulic traction motor on the outside of the curve in a closed-loop control.

3. The hydrostatic traction drive system as recited in claim 2, wherein for closed-loop control of the inlet-side pressure of the hydraulic motor on the inside of the curve, the displacement volume of the hydraulic traction motor on the inside of the curve is reduced by the electronic control device, and the actuation of the control valve associated with the hydraulic traction motor on the inside of the curve is reduced such that an increase in the speed of the traction motor on the inside of the curve is prevented.

4. The hydrostatic traction drive system as recited in claim 3, wherein the electronic control device calculates a volumetric flow demand of the hydraulic traction motor on the inside of the curve from a set displacement volume of the traction motor on the inside of the curve, and sets the control valve of the hydraulic traction motor on the inside of the curve to the calculated volumetric flow demand of the hydraulic traction motor on the inside of the curve.

5. The hydrostatic traction drive system as recited in claim 4, wherein the volumetric flow delivered to the control valve of the hydraulic traction motor on the inside of the curve is calculated by the electronic control device from an actuation signal of the associated control valve and a pressure differential at the associated control valve.

6. The hydrostatic traction drive system as recited in claim 1, wherein for travel around a curve, the actuation of the control valve associated with the vehicle side on the inside of the curve is reduced by the electronic control device, and during travel around the curve the inlet-side pressure of the hydraulic traction motor on the outside of the curve is controlled by the electronic control device to the inlet-side pressure of the traction motor on the inside of the curve in a closed-loop control.

7. The hydrostatic traction drive system as recited in claim 6, wherein for closed-loop control of the inlet-side pressure of the hydraulic traction motor on the outside of the curve, the displacement volume of the hydraulic traction motor on the outside of the curve is increased by the electronic control device and the actuation of the control valve associated with the hydraulic traction motor on the outside of the curve is increased such that a decrease in the speed of the traction motor on the outside of the curve is prevented.

8. The hydrostatic traction drive system as recited in claim 7, wherein the electronic control device calculates the volumetric flow demand of the hydraulic traction motor on the outside of the curve from the set displacement volume of the traction motor on the outside of the curve and sets the control valve of the hydraulic traction motor on the outside of the curve to the calculated volumetric flow demand of the hydraulic traction motor on the outside of the curve.

9. The hydrostatic traction drive system as recited in claim 8, wherein the volumetric flow delivered to the control valve of the hydraulic traction motor on the outside of the curve is calculated by the electronic control device from the actuation signal of the associated control valve and the differential pressure at the associated control valve.

10. The hydrostatic traction drive system as recited in claim 1, wherein the electronic control device is operatively connected with pressure sensors, by means of which the inlet-side pressure at the first hydraulic traction motor and at the second hydraulic traction motor are measured.

11. The hydrostatic traction drive system as recited in claim 1, wherein the first hydraulic traction motor drives a first caterpillar track of a first vehicle side of the mobile machine and the second hydraulic traction motor drives a second caterpillar track of the second vehicle side of the mobile machine.

12. A method for the operation of a hydrostatic traction drive system of a mobile machine, wherein the traction drive system has a first hydraulic traction motor associated with a first vehicle side and a second hydraulic traction motor associated with a second vehicle side, wherein the hydraulic traction motors are operated in an open circuit and are jointly supplied with hydraulic fluid by a single hydraulic pump, wherein the first hydraulic traction motor is controlled by a first control valve and the second hydraulic traction motor is controlled by a second control valve, wherein a speed differential is set on the hydraulic traction motors for travel around a curve, wherein, during travel around a curve, a displacement volume of the hydraulic traction motor on the inside of the curve is reduced and, simultaneously, by activation of the control valve associated with the hydraulic traction motor on the inside of the curve, the volumetric flow of hydraulic fluid delivered to the hydraulic traction motor on the inside of the curve is reduced such that the inlet-side pressure of the hydraulic traction motor on the inside of the curve is equalized with the inlet-side pressure of the hydraulic traction motor on the outside of the curve, and an increase in the speed of the hydraulic traction motor on the inside of the curve is prevented, or wherein, during travel around a curve, a displacement volume of the hydraulic traction motor on the outside of the curve is increased and, simultaneously, by activation of the control valve associated with the hydraulic traction motor on the outside of the curve, the volumetric flow of hydraulic fluid delivered to the hydraulic traction motor on the outside of the curve is increased such that the inlet-side pressure of the hydraulic traction motor on the outside of the curve is equalized with the inlet-side pressure of the hydraulic traction motor on the inside of the curve, and a decrease in the speed of the hydraulic traction motor on the outside of the curve is prevented.

* * * * *